(12) United States Patent
Wijenayake et al.

(10) Patent No.: US 8,261,236 B2
(45) Date of Patent: Sep. 4, 2012

(54) DETECTING PLUG-IN AND FRAGMENT ISSUES WITH SOFTWARE PRODUCTS

(75) Inventors: Sudarsha D. Wijenayake, Nepean (CA); Peter L. Farrell, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1344 days.

(21) Appl. No.: 11/927,885

(22) Filed: Oct. 30, 2007

(65) Prior Publication Data

US 2009/0113392 A1     Apr. 30, 2009

(51) Int. Cl.
G06F 9/44      (2006.01)
G06F 9/445     (2006.01)

(52) U.S. Cl. ......... 717/120; 717/121; 717/124; 717/170

(58) Field of Classification Search .................. None
See application file for complete search history.

(56) References Cited

U.S. PATENT DOCUMENTS

| | | | |
|---|---|---|---|
| 2006/0026591 A1* | 2/2006 | Backhouse et al. | 717/177 |
| 2006/0064422 A1* | 3/2006 | Arthurs et al. | 707/10 |
| 2006/0184925 A1 | 8/2006 | Ficatier et al. | |
| 2006/0230396 A1 | 10/2006 | Martinez et al. | |
| 2006/0236313 A1 | 10/2006 | Bibr et al. | |
| 2006/0248506 A1 | 11/2006 | Luo et al. | |
| 2006/0277537 A1 | 12/2006 | Chan et al. | |
| 2007/0002689 A1 | 1/2007 | Mateescu et al. | |
| 2007/0006039 A1 | 1/2007 | Fichter et al. | |
| 2007/0079299 A1 | 4/2007 | Daly | |
| 2007/0100870 A1 | 5/2007 | Jenkins et al. | |

OTHER PUBLICATIONS

Gruber et al., "The Eclipse 3.0 Platform: Adopting OSGi Technology", IBM Systems Journal, vol. 44, No. 2, pp. 289-299, 2005.
Martin Buechi, "Eclipse Plugin-Based Applications and J2EE Components", pp. 1-18, http://www.choicemaker.com/publications/EclipsePlugins.html.

* cited by examiner

*Primary Examiner* — Chuck Kendall
(74) *Attorney, Agent, or Firm* — Hoffman Warnick LLC; Daniel McLoughlin

(57) ABSTRACT

The present invention comprises utility capable of detecting various issues with plug-ins and fragments in Eclipse and Eclipse-based products. In order to find issues, the utility first seeks information about the sites available in the given product. Once the sites have been located, the utility seeks information about the plug-ins and fragments in each site that are expected to resolve in the product. Once the utility has determined what particular plug-ins and fragments are expected to resolve in each site, it parses both the text and XML manifest of each candidate plug-in and fragments in order to gather the following information: Once the above information of each candidate plug-in and fragment has been gathered, the utility analyzes the particular information in details and performs a series of tests to find whether the candidate plug-ins and fragments have issues. For each issue that the utility finds, a detailed explanation regarding the particular issue, cause and details leading to resolution of the issue is provided in an interactive HTML based report which is given to the user at the end of the investigation.

22 Claims, 4 Drawing Sheets

DETECTING PLUG-IN AND FRAGMENT ISSUES WITH SOFTWARE PRODUCTS

FIELD OF THE INVENTION

The present invention generally relates to issues detection. Specifically, the present invention detects issues with plug-ins and/or fragments in Eclipse and related products.

BACKGROUND OF THE INVENTION

Eclipse is an ongoing project in support of an open source integrated development environment (IDE). Eclipse provides a framework and a basic platform (called the Eclipse Platform) that allows a company to build an integrated development environment from plug-in software components provided by Eclipse members. Eclipse members include Hewlett Packard, IBM, and many other companies. A member company must offer an Eclipse plug-in product within a year of joining.

A major advantage to an open source development platform is that an enterprise can mix and match Eclipse-conforming products rather than being committed to a single vendor's suite of development products. Although the Eclipse Platform is written in Java, it supports plug-ins that allow developers to develop and test code written in other languages. The Eclipse architectural framework supports plug-ins for Java development tools, C and C++ development tools, test and performance tools, Web tools, business intelligence and reporting, modeling and graphical frameworks, project models, runtime and update capabilities, and user interface building.

The Eclipse Framework is composed of plug-ins, fragments and features (let's call them bundles in general for simplicity). Plug-ins introduce functionality to the framework. Fragments internationalize plug-ins by providing translations for the externalized strings of plug-ins in order for their functionality to be seen and used in different languages. Features componentized plug-ins and fragments by grouping them together in order to be installed, uninstalled, enabled and disabled as groups instead of individuals. Unfortunately, plug-ins and fragments very often have "issues", such as being missing, being unresolved, etc. Currently no approach provides a way to resolve such issues in Eclipse or other similar products. In view of the foregoing, there exists a need for a solution that solves at least one of these deficiencies.

SUMMARY OF THE INVENTION

The present invention teaches a utility capable of detecting various issues with plug-ins and fragments in Eclipse and Eclipse based products. In order to find issues, the utility first seeks information about the sites available in the given product. In Eclipse based application development, sites are defined as the locations containing features, plug-ins and fragments that compose the product. Once the sites have been located, the utility seeks information about the plug-ins and fragments in each site that are expected to resolve in the product. Once the utility has determined what particular plug-ins and fragments are expected to resolve in each site, it parses both the text and XML manifest of each candidate plug-in and fragments in order to gather the following information:

Identification (i.e. plug-in id)
Version
Platform filters such as platform, architecture, language and other constrains
Dependent plug-ins fragments
Included plug-ins and fragments
Information regarding host plug-in (only for fragments)
Other info Once the above information of each candidate plug-in and fragment has been gathered, the utility analyzes the particular information in details and performs a series of tests to find whether the candidate plug-ins and fragments have issues. For each issue that the utility finds, a detailed explanation regarding the particular issue, cause and possible solutions to resolve the issue is provided in an interactive HTML based report which is given to the user at the end of the investigation. The following is a set of issues that the utility is capable of finding.

Plug-ins and fragments missing from a given product and hierarchies of plug-ins and fragments that are not resolved due to the absence of each missing plug-in and fragment Hierarchy of plug-ins and fragments that are not resolved due to the absence of a required version of other plug-ins and fragments Plug-ins and fragments with corrupted or no manifests and hierarchies of plug-ins and fragments that are not resolved due to the plug-ins and fragments with corrupted or no manifests Fragments that are not resolved due to the absence of their host plug-ins Hierarchies of plug-ins and fragments that are not resolved due to the unavailability of each missing host plug-in Plug-ins and fragments prevented from resolving due to unsatisfied platform filters and execution environments Plug-ins and fragments prevented from resolving due contradictions between their versions and the Eclipse Versioning Convention, and how each such contradiction influences the resolution of the particular plug-in and fragment Unavailable optional dependencies (plug-ins and fragments) of plug-ins and fragments Hierarchies of plug-ins and fragments that may not be resolved properly due to the absence of each missing optional dependency Unavailability of a particular version of the optional dependencies (plug-ins and fragments) of plug-ins and fragments Hierarchies of plug-ins and fragments that may not be resolved properly due to the absence of the particular version of each optional dependency In addition, the plug-ins and fragments that are excluded from the product by the site configurations are also analyzed. The user is informed about these excluded plug-ins and fragments in order to allow him/her to decide whether each such plug-in and fragment is supposed to be excluded from product. Experience demonstrates that plug-ins and fragments are sometimes excluded from product by mistake. When it happens, this particular functionality of the utility enables the user to pinpoint such plug-ins and fragments, and then include them to the product sooner than later.

A first aspect of the present invention provides a method for detecting issues in a software product, comprising: obtaining information pertaining to a set (a quantity of one or more as defined herein) of plug-ins and fragments available from a set of sites registered with a particular instance of the software product; analyzing the information and performing a set of tests to determine whether the set of plug-ins and fragments have issues; and providing, for each issue, details regarding the issue, its cause and details leading to resolution of the issue.

A second aspect of the present invention provides a system for detecting issues in a software product, comprising: a system for obtaining information pertaining to a set of plug-ins and fragments available from a set of sites registered with a particular instance of the software product; a system for analyzing the information and performing a set of tests to determine whether the set of plug-ins and fragments have issues; and a system for providing, for each issue, details regarding the issue, its cause and details leading to resolution of the issue.

A third aspect of the present invention provides a program product stored on a computer readable medium for detecting issues in a software product, the computer readable medium comprising program code for causing a computer system to: obtain information pertaining to a set of plug-ins and fragments available from a set of sites registered with a particular instance of the software product; analyze the information and performing a set of tests to determine whether the set of plug-ins and fragments have issues; and provide, for each issue, details regarding the issue, its cause and details leading to resolution of the issue.

A fourth aspect of the present invention provides a method for deploying a system for detecting issues in a software product, comprising: providing a computer infrastructure being operable to: obtain information pertaining to a set of plug-ins and fragments available from a set of sites registered with a particular instance of the software product; analyze the information and performing a set of tests to determine whether the set of plug-ins and fragments have issues; and provide, for each issue, details regarding the issue, its cause and details leading to resolution of the issue.

A fifth aspect of the present invention provides a computer-implemented business method for detecting issues in a software product, comprising: obtaining information pertaining to a set of plug-ins and fragments available from a set of sites registered with a particular instance of the software product; analyzing the information and performing a set of tests to determine whether the set of plug-ins and fragments have issues; and providing, for each issue, details regarding the issue, its cause and details leading to resolution of the issue.

A sixth aspect of the present invention provides a data processing system for detecting issues in a software product, comprising: a memory medium comprising instructions; a bus coupled to the memory medium; and a processor coupled to the bus that when executing the instructions causes the data processing system to: obtain information pertaining to a set of plug-ins and fragments available from a set of sites registered with a particular instance of the software product; analyze the information and performing a set of tests to determine whether the set of plug-ins and fragments have issues; and provide, for each issue, details regarding the issue, its cause and details leading to resolution of the issue.

BRIEF DESCRIPTION OF THE DRAWINGS

These and other features of this invention will be more readily understood from the following detailed description of the various aspects of the invention taken in conjunction with the accompanying drawings in which.

Figure 1:
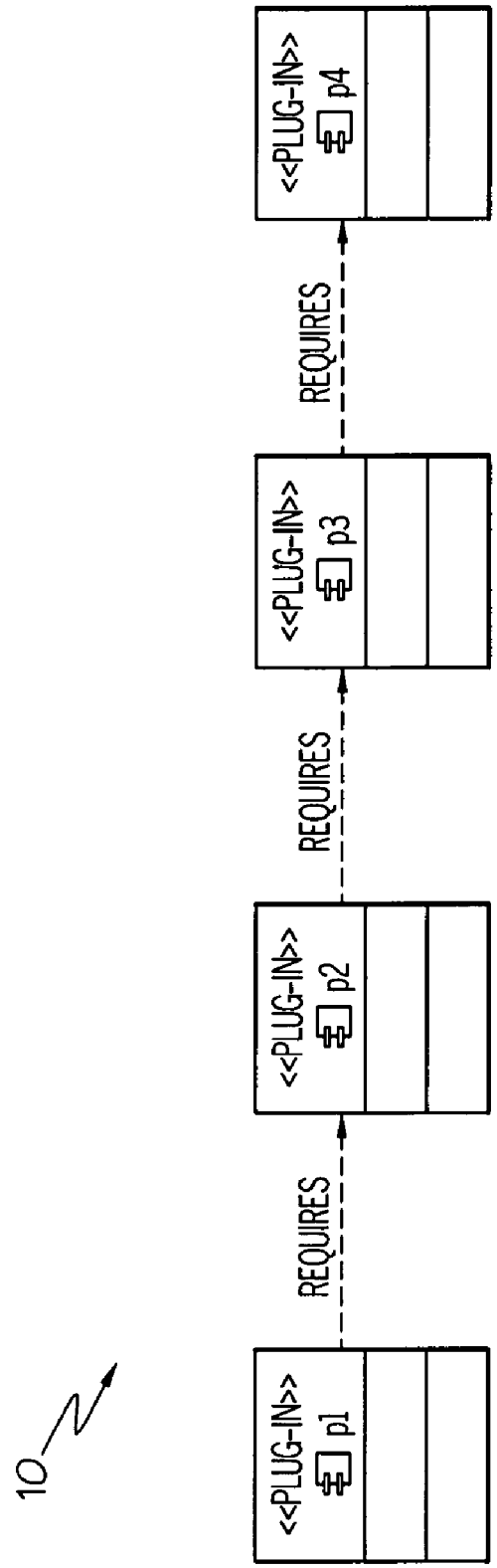
FIG. 1 depicts illustrative hierarchical dependent structures according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
I. General Description
  A. Illustrative Examples
  B. Utility Operation
II. Computerized Implementation I. General Description It should be understood in advance that although this disclosure is written with respect to detecting plug-in/fragment issues for Eclipse and Eclipse-based products, the teachings herein could be expanded to other similar products. In any event, as indicated above, the present invention teaches a utility capable of detecting various issues with plug-ins and fragments in Eclipse and Eclipse-based products. In order to find issues, the utility first seeks information about the sites available in the given product. In Eclipse based application development, sites are defined as the locations containing features, plug-ins and fragments that compose the product. Once the sites have been located, the utility seeks information about the plug-ins and fragments in each site that are expected to resolve in the product. Once the utility has determined what particular plug-ins and fragments are expected to resolve in each site, it parses both the text and XML manifest of each candidate plug-in and fragments in order to gather the following information:

Identification (i.e. plug-in id)
  Version
  Platform filters such as platform, architecture, language and other constrains
  Dependent plug-ins fragments
  Included plug-ins and fragments
  Information regarding host plug-in (only for fragments)
  Other info Once the above information of each candidate plug-in and fragment has been gathered, the utility analyzes the particular information in details and performs a series of tests to find whether the candidate plug-ins and fragments have issues. For each issue that the utility finds, a detailed explanation regarding the particular issue, cause and possible solutions to resolve the issue is provided in an interactive HTML based report which is given to the user at the end of the investigation. The following is a set of issues that the utility is capable of finding.

Plug-ins and fragments missing from a given product and hierarchies of plug-ins and fragments that are not resolved due to the absence of each missing plug-in and fragment Hierarchy of plug-ins and fragments that are not resolved due to the absence of a required version of other plug-ins and fragments Plug-ins and fragments with corrupted or no manifests and hierarchies of plug-ins and fragments that are not resolved due to the plug-ins and fragments with corrupted or no manifests Fragments that are not resolved due to the absence of their host plug-ins Hierarchies of plug-ins and fragments that are not resolved due to the unavailability of each missing host plug-in Plug-ins and fragments prevented from resolving due to unsatisfied platform filters and execution environments Plug-ins and fragments prevented from resolving due contradictions between their versions and the Eclipse Versioning Convention, and how each such contradiction influences the resolution of the particular plug-in and fragment Unavailable optional dependencies (plug-ins and fragments) of plug-ins and fragments Hierarchies of plug-ins and fragments that may not be resolved properly due to the absence of each missing optional dependency Unavailability of a particular version of the optional dependencies (plug-ins and fragments) of plug-ins and fragments Hierarchies of plug-ins and fragments that may not be resolved properly due to the absence of the particular version of each optional dependency In addition, the plug-ins and fragments that are excluded from the product by the site configurations are also analyzed. The user is informed about these excluded plug-ins and fragments in order to allow him/her to decide whether each such plug-in and fragment is supposed to be excluded from product. Experience demonstrates that plug-ins and fragments are sometimes excluded from product by mistake. When it happens, this particular functionality of the utility enables the user to pinpoint such plug-ins and fragments, and then include them to the product sooner than later.

A. ILLUSTRATIVE EXAMPLES

This section will describe in greater detail various issues that could exist with respect to plug-ins and/or fragments.

Plug-ins and Fragments with invalid, corrupted or no manifests: Each plug-in, fragment and feature in Eclipse must have a valid manifest in order for it to be integrated into the framework. A plug-in or fragment with an invalid, corrupted or no manifest contributes no functionality even though the particular bundle is physically present in the product. In the fields of Release Engineering as well as Software Quality Engineering, it is extremely important for the engineer to identify such plug-ins and fragments and restore their manifests as quickly as possible. The question here is how to discover such plug-ins and fragments without consuming a great deal of resources and effort.

If the product is composed of a few bundles, the Release Engineer may be able to manually detect the plug-ins and fragments with corrupted manifests and restore them appropriately. However, in reality, Eclipse based products are not necessarily composed of a small number of plug-ins and fragments. For instance, the IBM product Rational Software Architect (RSA) version 6.0 consists of over 10,000 plug-ins and fragments. Manually detecting the bundles with invalid, corrupted and no manifests in such a product may become impossible. In addition, performing a formal test cycle to discover such issues could be costly and time consuming. Fortunately, the utility of the present invention solves this problem by automatically detecting such bundles.

Plug-ins and Fragments with versioning errors: The Eclipse Versioning Convention mandates that the version of a plug-in or fragment must be in the following form major.minor.service.qualifier. The major, the minor and the service identifiers must be numerals. The qualifier on the other hand may contain numerals or strings at the developer's convenience. In addition, the version must not contain extra identifiers than the allowed options. A plug-in or fragment will not be resolved if its version violates these standards. Experience demonstrates that the software developers (mostly who are new to Eclipse) do not sometimes follow the versioning convention as is. As a result, the plug-ins and fragments delivered by such individuals may not be resolved even though the bundles themselves are physically present in the product. As stated before, if a plug-in is not resolved, it will contribute no functionality to the product. Therefore, it is important for the Release Engineer to identify such plug-ins and fragments and correct their versions as quickly as possible. Manually detecting such issues would be impossible if the product was composed of a large number of plug-ins and fragments. Performing a formal test cycle to discover such issues could become costly and time consuming. Fortunately, the utility of the present invention solves this problem by automatically discovering such issues.

Plug-ins and Fragments with incompatible platform filters: The platform filter of a plug-in or fragment specifies the platform that the particular bundle is allowed to be resolved. For instance, the following platform filter specifies that the corresponding bundle must only be resolved on a platform running on an x86 architecture and using a Linux operating system built on the Motif windowing system.

(& (osgi.arch=x86) (osgi.os=linux) (osgi.ws=motif))

If a plug-in with the above platform filter is included into a product developed for the Windows platform, the targeted plug-in will not resolve and, therefore, will contribute no functionality to the product. This means that including a plug-in designed for one platform into a product developed for another platform not only is useless, but also increases the size of the product unnecessarily. Experience teaches us that plug-ins and fragments designed for one platform are sometimes included into a product developed for another platform due to various reasons. It is the responsibility of the Release Engineer to identify such bundles and remove them from the product sooner than later.

Experience also demonstrates that the developers (mostly who are new to Eclipse) sometimes assign incorrect platform filters by making the corresponding plug-ins and fragments ineffective on the targeted platform. The Release Engineer must also identify such bundles and correct their platform filters as quickly as possible. Manually detecting and correcting the related issue might be possible if the product was composed of a small number of plug-ins and fragments. Performing a formal test cycle to recognize such plug-ins and fragments could become costly and time consuming. Fortunately, the utility of the present invention solves this problem by automatically detecting this issue.

Plug-ins and Fragments with unavailable dependencies: The plug-ins in Eclipse often reuse functionality that other plug-ins contribute to the product. These associations form strong hierarchical dependences between plug-ins which enforces a plug-in to be resolved only if all of its dependencies are resolved in the product. For a more specific example of hierarchical dependent structures 10, refer to FIG. 1. In this example, assume that plug-in p1 depends upon the functionality provided by plug-in p2, plug-in p2 depends upon the functionality provided by plug-in p3 and plug-in p3 depends upon the functionality provided by plug-in p4. In this particular example, plug-in p1 requires the existence of plug-in p2 in order to be resolved in the product. Similarly, plug-in p2 requires the existence of plug-in p3 and plug-in p3 requires the existence of plug-in p4 in order to be resolved in the product. This hierarchical dependency structure requires all of its participants such as plug-ins p1, p2, p3 and p4 to be resolved in the product.

Now assume that plug-in p4 in FIG. 1 is mistakenly excluded from the product. In such a situation, the complete dependency hierarchy will collapse by making the plug-ins p1, p2 and p3 unresolved even though the plug-ins p1, p2 and p3 are physically present in the product. If the Release Engineer has somehow known that the plug-in p4 is missing from the product and that is what is preventing the rest of the plug-ins p1, p2 and p3 from being resolved, then this particular issue can easily be resolved by simply introducing the missing plug-in p4 into the product. The question here is how to identify that it is the unavailability of plug-in p4 is the root cause of the problem. Experience shows that manually detecting and correcting such issues would be exhaustively lengthy and time consuming. Therefore, such process could quickly become impossible as the number of plug-ins in the product increases. Fortunately, the utility of the present invention solves this problem by automatically detecting this issue.

Plug-ins and Fragments with unavailable optional dependencies: Previously, it was mentioned that the dependences between plug-ins and fragments would prevent bundles from resolving if all of the associated dependencies are not available or resolved in the product. However, if a dependency of a plug-in or fragment is made optional, the associated plug-in or fragment will still be resolved even though the particular dependency may not be available or resolved in the product. This behavior of Eclipse makes plug-in development more flexible, but introduces a new breed of issues and challenges to the fields of Software Quality Engineering and Release Engineering.

Now assume that a plug-in p1 has an optional dependency. Under these circumstances, the plug-in p1 will still be resolved even though the plug-in p2 was mistakenly excluded from the product. In addition, Eclipse would assume that the particular product must be properly configured, therefore, would not raise concerns about the unavailability of the plug-in p2 what so ever.

The question here is how a Release Engineer must identify such issues and correct them as soon as possible. Experience shows that manually detecting and correcting such issues could be exhaustively lengthy and time consuming. Performing a formal test cycle to recognize the related issue might be costly and time consuming. Fortunately, the utility of the present invention solves this problem by automatically detecting this issue.

B. UTILITY OPERATION

Installing the Utility: The following steps can be completed in order to install the utility:

Download and extract the archived update site file into a directory. This step will create the update site of the utility (i.e. a new directory named update_site) at the chosen location.

Start Eclipse or Eclipse based product.

Launch the Eclipse Update Manager by selecting Help→Software Updates→File and Install . . . from the main menu of the product. The Install/Update Dialog should be launched.

Select the Search for new features to install option from the Install/Update Dialog and press Next.

Add the directory update_site from step 1 as a new local site to the Install/Update Dialog and press Finish. The Updates Dialog is displayed. Press Next button on the Updates Dialog.

Accept the license agreement on the Install Dialog and press Next.

Select utility as the feature to install on the Install Dialog and press Finish.

Accept to restart the product when prompted in order for utility to take effect.

Launching utility in Interactive Mode: The following steps can be completed in order to launch the utility in the interactive mode:

Select Window→Open Perspective→Other . . . from the main menu of Eclipse or Eclipse based product. The Select Perspective dialog should be launched.

Figure 2:
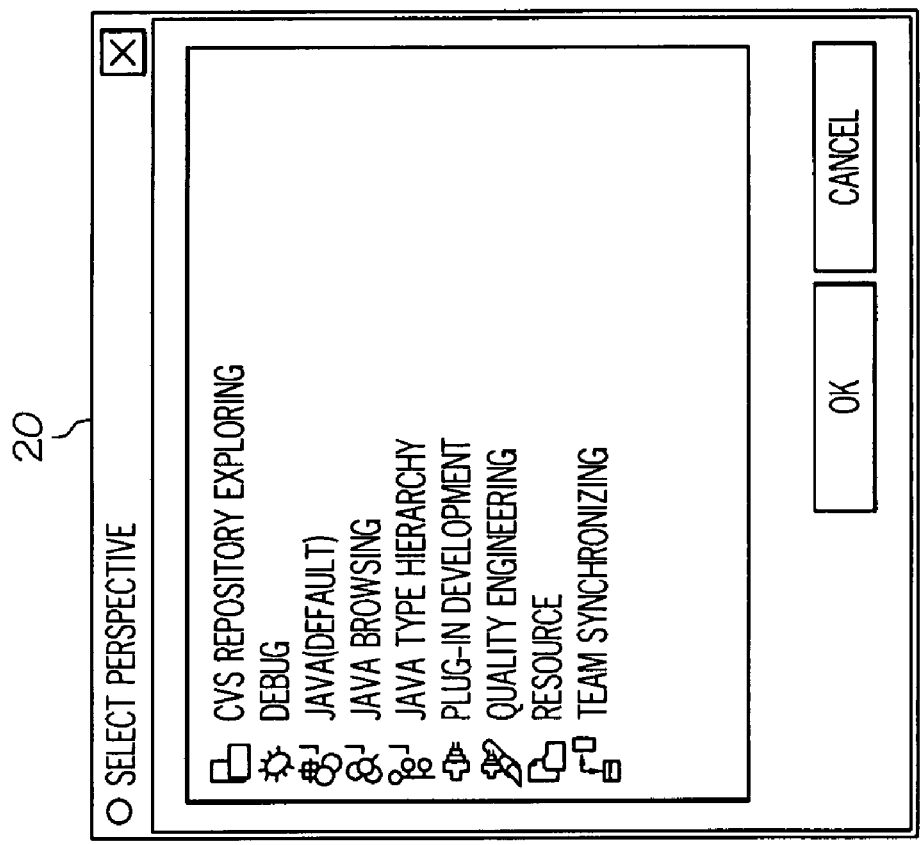
FIG. 2 an illustrative screenshot of a select perspective dialog according to the present invention.

Select Quality Engineering from the list of perspectives and press the OK button. A screenshot of the Select Perspective dialog 20 is shown in FIG. 2

Figure 3:
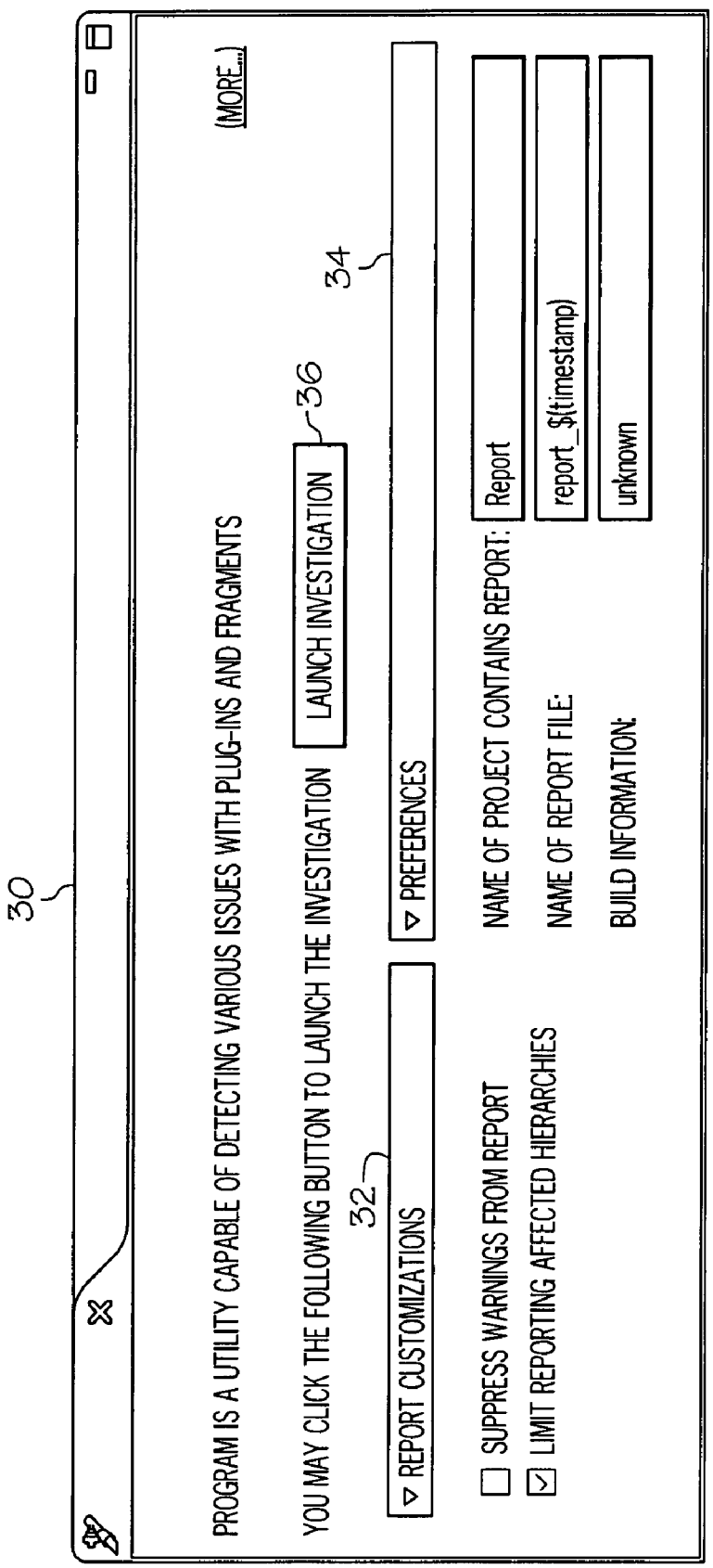
FIG. 3 depicts an illustrative screenshot of a utility view according to the present invention.

Ensure that the Quality Engineering perspective appears on the workbench Also ensure that the utility View appears in the bottom right-hand pane of the Quality Engineering Perspective. A screenshot of the Utility View 30 is shown in FIG. 3.

Report Customization: The following options, which are available under the Report Customizations section 32, can be used in order to personalize the report generated by this utility:

Suppress Warning From Report: If selected, utility will ignore reporting the warnings that it finds with regards to the plug-ins and the fragments in the product.

Limit Reporting Affected Hierarchies: If selected, utility will limit reporting unresolved plug-in and fragment hierarchies to a certain extent in order to speed up the investigation. It has been proven that this particular option would significantly improve the performance of utility when the utility is launched on a defective product.

The Preferences section 34 can be used as desired in order to alter the name of the report and the name of the project, which will contain the report that utility generates. Finally, you may press the Launch Investigation button 36 on the Utility View 30 in order to invoke the utility. A progress monitor is displayed while the investigation is being performed. Once the investigation is completed, a report will be generated in HTML and displayed in the editor pane which is located in the upper portion of the Quality Engineering Perspective Launching utility in Silent Mode: The following can be executed on the command prompt in order to launch utility in the silent mode:

```
<path to Eclipse or Eclipse based product>
     -application com.ibm.qetools.bundledoctor.investigate
     -pathToReport <path to report file>
```

Where,

<path to Eclipse or Eclipse based product>: absolute or relative path to the eclipse executable (eclipse.exe on Windows or eclipse.bin on Linux)

"<path to report file>: absolute or relative path to the report file

Report Customizations: The following options can be used as desired in order to customize the report generated by this utility:

suppressWarningFromReport: If provided, utility will ignore reporting the warnings that it finds with regards to the plug-ins and the fragments in the product.

limitReportingAffectedHierarchies: If provided, utility will limit reporting unresolved plug-in and fragment hierarchies to a certain extent in order to speed up the investigation. It has been proven that this particular option would significantly improve the performance of utility when the utility is launched on a defective product.

Utility Report: The utility generates a report reflecting the issues with plug-ins and fragments at the end of its investigation. The report is generated in HTML and contains the following sections.

Section 1: plug-ins and fragments missing from the product. Section 1 of the report provides a complete list of plug-ins and fragments which are missing from the product. This section also reports the hierarchies of bundles that are not resolved due to the unavailability of each missing plug-in and fragment. Note that a missing bundle may prevent other plug-ins and fragments, which directly or indirectly depend upon it, from resolving in the product. Unresolved bundles contribute no functionality even though the bundles themselves are physically present in the product.

Section 2: plug-ins and fragments with no manifests Section 2 provides a complete list of plug-ins and fragments with invalid, corrupted or no manifests. A plug-in or fragment with an invalid, corrupted or no manifest will not be resolved. Therefore, such bundles will contribute no functionality even though the bundles themselves are physically present in the product.

Section 3: plug-ins and fragments with versioning errors Section 3 provides information about plug-ins and fragments that do not comply with the Eclipse Versioning Convention (discussed in Section 1.1.3). This section also provides instructions on adjusting the version strings of such bundles in order for them to comply with the convention. The plug-ins and fragments that don't comply with the Eclipse Versioning Convention will not be resolved in product. Therefore, such bundles provide no functionality even though they themselves are physically present in the product.

Section 4: plug-ins and fragments disabled due to platform filters Section 4 provides information about plug-ins and fragments which were disabled due to the incompatible platform filters that are assigned to them. This section also provides instructions on adjusting the platform filters of such bundles in order for them to be able to resolve on the targeted platforms. If a plug-in or fragment carries a platform filter that doesn't match the system which hosts the product, the bundle itself will not be resolved on the particular host and hence contributes no functionality to the product.

Section 5: plug-ins and fragments with unavailable optional dependencies Section 5 provides information about plug-ins and fragments with unavailable optional dependencies. If a dependency of a plug-in or fragment is made optional, the associated plug-in or fragment will be resolved even though the particular dependency may not be available or resolved in the product. This behavior of Eclipse makes plug-in development more flexible, but introduces a new breed of issues and challenges to the fields of Software Quality Engineering and Release Engineering.

Section 6: plug-ins and fragments with errors and warnings Section 6 provides a detailed description about all the errors and warnings found with regards to each plug-in and fragment in the product. The information that has been presented in the above five sections is also included in this section with more details.

II. Computerized Implementation

Figure 4:
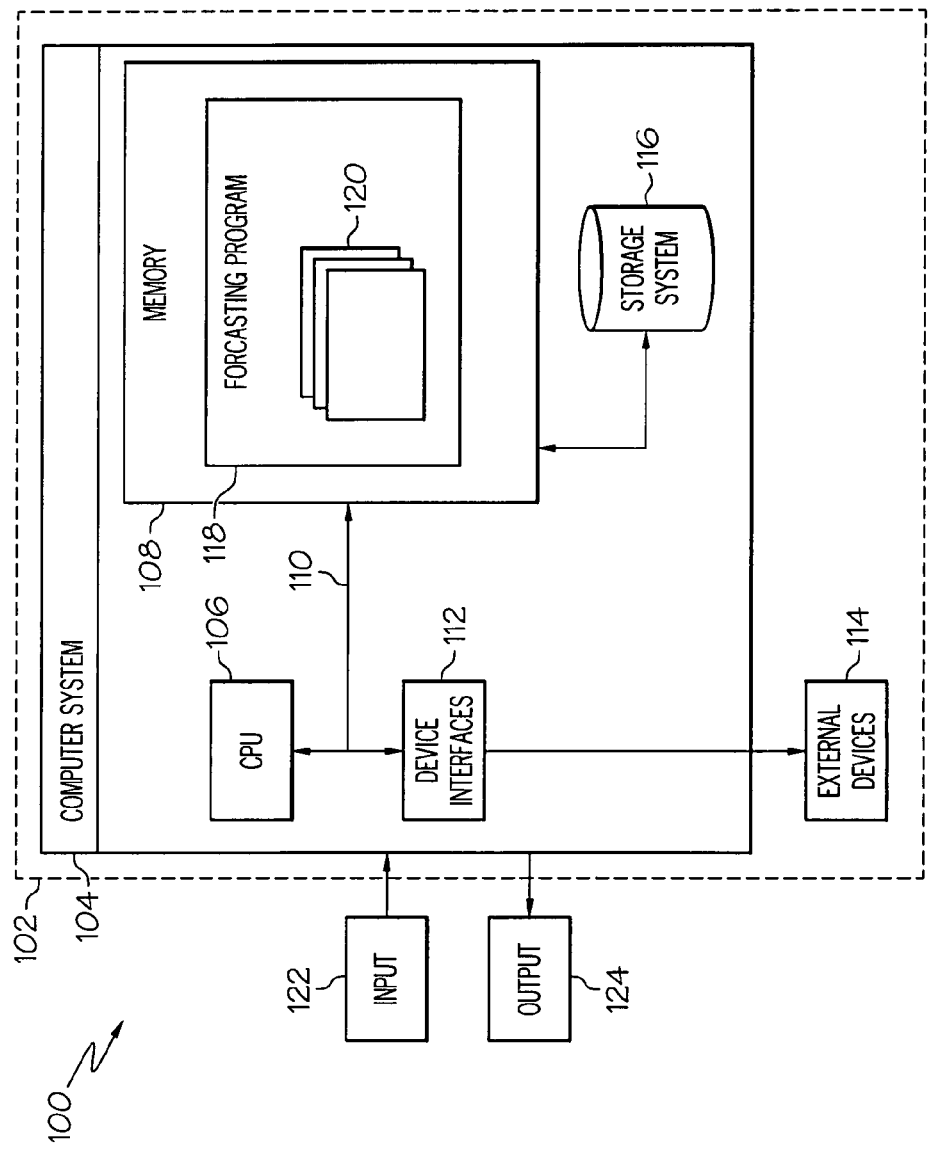
FIG. 4 depicts a more specific computerized implementation according to the present invention.

Referring now to FIG. 4, a computerized implementation 100 of the present invention is shown. As depicted, implementation 100 includes item computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, item computer system 104 of implementation 100 includes a processing unit 106, a memory 108, a bus 110, and device interfaces 112. Further, implementation 100 is shown having external devices 114, and storage system 116. In general, processing unit 106 executes computer program code, such as utility 118 having modules 120 that provide the functionality described herein, which are stored in memory 108 and/or storage system 116. While executing computer program code, processing unit 106 can read and/or write data to/from memory 108, storage system 116, and/or device interfaces 112. Bus 110 provides a communication link between each of the components in item computer system 104. Although not shown, item computer system 104 could also include I/O interfaces that communicate with: one or more external devices 114 such as a keyboard, a pointing device, a display, etc.); one or more devices that enable a user to interact with item computer system 104; and/or any devices (e.g., network card, modem, etc.) that enable item computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, item computer system 104 is only representative of various possible computer systems that can include numerous combinations of hardware. To this extent, in other embodiments, item computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external device 114. Still further, it is understood that one or more additional components (e.g., system software, math co-processing unit, etc.) not shown in FIG. 4 can be included in item computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into item computer system 104.

Shown in memory 108 of item computer system 104 is utility 118, which includes a set (at least one) of modules 120. The modules generally provide the functions of the present invention as described herein. Specifically (among other things), set of modules 120 are configured to: identify the set of plug-ins and fragments expected to comprise the software product; obtain information pertaining to a set of plug-ins and fragments available from a set (one or more) of sites 122 registered with a particular instance of the software product; analyze the information and performing a set of tests to determine whether the set of plug-ins and fragments have issues; provide, for each issue, details regarding the issue, its cause and details leading to resolution of the issue (shown as report(s) 124).

While shown and described herein as an approach for detecting issues in a software product it is understood that aspects of the invention further provide various alternative embodiments. For example, in one embodiment, the invention provides a computer-readable/useable medium that includes computer program code to enable a computer infrastructure to detect issues in a software product. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to detect issues in a software product. In this case, the service provider can create, maintain, and support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for detecting issues in a software product. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as item computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or data processing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method of developing a software product, comprising:
receiving, on a computer system including at least one computing device, a request to evaluate a set of plug-ins and fragments corresponding to the software product as part of a quality engineering investigation of the software product; and
evaluating the set of plug-ins and fragments in response to the request using the computer system, the evaluating including:
obtaining, on the computer system, information pertaining to the set of plug-ins and fragments from a manifest corresponding to each plug-in and fragment in the set of plug-ins and fragments available from a set of sites registered with a particular instance of the software product, wherein each site in the set of sites includes at least one plug-in in the set of plug-ins and fragments, wherein each fragment in the set of plug-ins and fragments internationalizes a corresponding plug-in in the set of plug-ins and fragments, and wherein the information includes version information and dependency information for each plug-in and fragment in the set of plug-ins and fragments;
analyzing the information and performing a set of tests using the computer system to determine whether the set of plug-ins and fragments have any one of a set of issues, wherein the set of issues includes: an error relating to the manifest, an error relating to the version information, and an error relating to the dependency information; and providing, using the computer system and for each issue determined to be present, details regarding the issue, a cause of the issue, and details corresponding to resolution of the issue for use during the quality engineering investigation.

2. The method of claim 1, the evaluating further comprising identifying a complete set of plug-ins and fragments expected to compose the software product, wherein the obtaining and analyzing are performed for each plug-in and fragment in the complete set of plug-ins and fragments.

3. The method of claim 1, the information including: an identification, a version, and platform filters, and the information further including one or more of: dependent plug-ins fragments, included plug-ins and fragments, and information regarding host plug-ins.

4. The method of claim 1, wherein the providing includes outputting a report containing the details for each of a set of issues determined to be present in the set of plug-ins and fragments corresponding to the software product.

5. The method of claim 4, the report being in HTML format and including a plurality of sections, each section corresponding to a unique type of issue.

6. The method of claim 1, the set of issues including: plug-ins and fragments with corrupted or no manifests, and hierarchies of plug-ins and fragments that are not resolved due to the plug-ins and fragments with corrupted or no manifests, fragments that are not resolved due to an absence of their host plug-ins, hierarchies of plug-ins and fragments that are not resolved due to an unavailability of each missing host plug-in, plug-ins and fragments that are prevented from resolving due to unsatisfied platform filters and execution environments, plug-ins and fragments prevented from resolving due contradictions between their versions and the a versioning convention of the software product, unavailable optional dependencies of plug-ins and fragments, hierarchies of plug-ins and fragments that may not be resolved properly due to an absence of each missing optional dependency, unavailability of a particular version of optional dependencies (plug-ins and fragments) of plug-ins and fragments, and hierarchies of plug-ins and fragments that may not be resolved properly due to an absence of a particular version of each optional dependency.

7. The method of claim 1, the software product being used for creating integrated development environments.

8. A system comprising:
a computer system for developing a software product by performing a method comprising:
receiving a request to evaluate a set of plug-ins and fragments corresponding to the software product as part of a quality engineering investigation of the software product; and
evaluating the set of plug-ins and fragments in response to the request, the evaluating including:
obtaining information pertaining to the set of plug-ins and fragments from a manifest corresponding to each plug-in and fragment in the set of plug-ins and fragments available from a set of sites registered with a particular instance of the software product, wherein each site in the set of sites includes at least one plug-in in the set of plug-ins and fragments, wherein each fragment in the set of plug-ins and fragments internalizes a corresponding plug-in in the set of plug-ins and fragments, and wherein the information includes version information and dependency information for each plug-in and fragment in the set of plug-ins and fragments;
analyzing the information and performing a set of tests to determine whether the set of plug-ins and fragments have any one of a set of issues, wherein the set of issues includes: an error relating to the manifest, an error relating to the version information, and an error relating to the dependency information; and
providing, for each issue determined to be present, details regarding the issue, a cause of the issue, and details corresponding to resolution of the issue for use during the quality engineering investigation.

9. The system of claim 8, the evaluating further comprising identifying a complete set of plug-ins and fragments expected to compose the software product, wherein the obtaining and analyzing are performed for each plug-in and fragment in the complete set of plug-ins and fragments.

10. The system of claim 8, the information including: an identification, a version, and platform filters, and the information further including one or more of: dependent plug-ins fragments, included plug-ins and fragments, and information regarding host plug-ins.

11. The system of claim 8, wherein the providing includes outputting a report containing the details for each of a set of issues determined to be present in the set of plug-ins and fragments corresponding to the software product.

12. The system of claim 11, the report being in HTML format and including a plurality of sections, each section corresponding to a unique type of issue.

13. The system of claim 8, the set of issues including: plug-ins and fragments with corrupted or no manifests and hierarchies of plug-ins and fragments that are not resolved due to the plug-ins and fragments with corrupted or no manifests, fragments that are not resolved due to an absence of their host plug-ins, hierarchies of plug-ins and fragments that are not resolved due to an unavailability of each missing host plug-in, plug-ins and fragments that are prevented from resolving due to unsatisfied platform filters and execution environments, plug-ins and fragments prevented from resolving due contradictions between their versions and the a versioning convention of the software product, unavailable optional dependencies of plug-ins and fragments, hierarchies of plug-ins and fragments that may not be resolved properly due to an absence of each missing optional dependency, unavailability of a particular version of optional dependencies (plug-ins and fragments) of plug-ins and fragments, and hierarchies of plug-ins and fragments that may not be resolved properly due to an absence of a particular version of each optional dependency.

14. The system of claim 8, the software product being used for creating integrated development environments.

15. A program product stored on a computer readable storage device for developing a software product, the computer readable storage device comprising program code for causing a computer system to perform a method comprising:
receiving a request to evaluate a set of plug-ins and fragments corresponding to the software product as part of a quality engineering investigation of the software product; and
evaluating the set of plug-ins and fragments in response to the request, the evaluating including:
obtaining information pertaining to the set of plug-ins and fragments from a manifest corresponding to each plug-in and fragment in the set of plug-ins and fragments available from a set of sites registered with a particular instance of the software product, wherein each site in the set of sites includes at least one plug-in in the set of plug-ins and fragments, wherein each fragment in the set of plug-ins and fragments internationalizes a corresponding plug-in in the set of plug-ins and fragments, and wherein the information includes version information and dependency information for each plug-in and fragment in the set of plug-ins and fragments;

analyzing the information and performing a set of tests to determine whether the set of plug-ins and fragments have any one of a set of issues, wherein the set of issues includes: an error relating to the manifest, an error relating to the version information, and an error relating to the dependency information; and providing, for each issue determined to be present, details regarding the issue, a cause of the issue, and details corresponding to resolution of the issue for use during the quality engineering investigation.

16. The program product of claim 15, the evaluating further comprising identifying a complete set of plug-ins and fragments expected to compose the software product, wherein the obtaining and analyzing are performed for each plug-in and fragment in the complete set of plug-ins and fragments.

17. The program product of claim 15, the information including: an identification, a version, and platform filters, and the information further including one or more of: dependent plug-ins fragments, included plug-ins and fragments, and information regarding host plug-ins.

18. The program product of claim 15, wherein the providing includes outputting a report containing the details for each of a set of issues determined to be present in the set of plug-ins and fragments corresponding to the software product.

19. The program product of claim 4, the report being in HTML format and including a plurality of sections, each section corresponding to a unique type of issue.

20. The program product of claim 15, the set of issues including: plug-ins and fragments with corrupted or no manifests and hierarchies of plug-ins and fragments that are not resolved due to the plug-ins and fragments with corrupted or no manifests, fragments that are not resolved due to an absence of their host plug-ins, hierarchies of plug-ins and fragments that are not resolved due to an unavailability of each missing host plug-in, plug-ins and fragments that are prevented from resolving due to unsatisfied platform filters and execution environments, plug-ins and fragments prevented from resolving due contradictions between their versions and the a versioning convention of the software product, unavailable optional dependencies of plug-ins and fragments, hierarchies of plug-ins and fragments that may not be configured properly due to an absence of each missing optional dependency, unavailability of a particular version of optional dependencies (plug-ins and fragments) of plug-ins and fragments, and hierarchies of plug-ins and fragments that may not be resolved due to an absence of a particular version of each optional dependency.

21. The program product of claim 15, the software product being used for creating integrated development environments.

22. A method for deploying a system for developing a software product, the method comprising:

providing a computer system configured to perform a method comprising:

receiving a request to evaluate a set of plug-ins and fragments corresponding to the software product as part of a quality engineering investigation of the software product; and evaluating the set of plug-ins and fragments in response to the request, the evaluating including:

obtaining information pertaining to the set of plug-ins and fragments from a manifest corresponding to each plug-in and fragment in the set of plug-ins and fragments available from a set of sites registered with a particular instance of the software product, wherein each site in the set of sites includes at least one plug-in in the set of plug-ins and fragments, wherein each fragment in the set of plug-ins and fragments internationalizes a corresponding plug-in in the set of plug-ins and fragments, and wherein the information includes version information and dependency information for each plug-in and fragment in the set of plug-ins and fragments;

analyzing the information and performing a set of tests to determine whether the set of plug-ins and fragments have any one of a set of issues, wherein the set of issues includes: an error relating to the manifest, an error relating to the version information, and an error relating to the dependency information; and providing, for each issue determined to be present, details regarding the issue, a cause of the issue, and details corresponding to resolution of the issue for use during the quality engineering investigation.

* * * * *